UNITED STATES PATENT OFFICE.

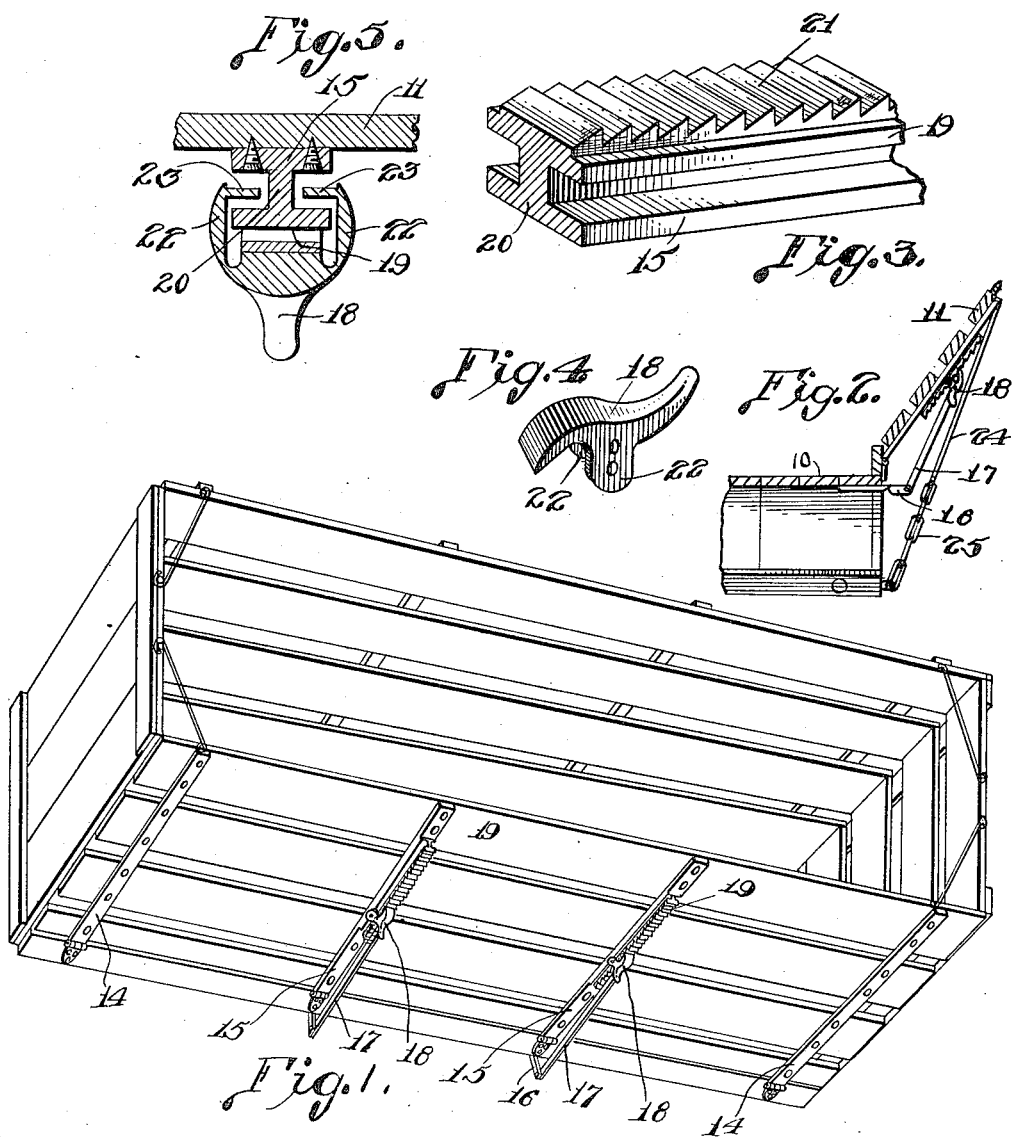

JAMES E. BRIGHT, OF LAMONT, NEBRASKA.

COMBINATION HAY AND HOG RACK.

1,069,759.  Specification of Letters Patent.  Patented Aug. 12, 1913.

Application filed May 25, 1912. Serial No. 699,722.

*To all whom it may concern:*

Be it known that I, JAMES E. BRIGHT, a citizen of the United States, residing at Lamont, in the county of Dundy and State of Nebraska, have invented certain new and useful Improvements in Combination Hay and Hog Racks, of which the following is a specification, reference being had therein to the accompanying drawing.

This invention relates to wagon bodies and the principal object of the invention is to produce an improved wagon body which may be converted from a hay wagon into a wagon for carrying live animals such as hogs or calves, or may be used for carrying corn, or other commodities.

Another object of the invention is to provide an improved type of brace for the side walls so that they may be held in either an open or closed position.

With the above and other objects in view, this invention consists in general of certain novel constructions, combinations and arrangements of parts, as will be hereinafter fully described, illustrated in the drawings, and specifically claimed.

In the accompanying drawings, like characters of reference indicate like parts in the several views, and Figure 1 is a perspective view of the wagon body, converted into a hog rack. Fig. 2 is a fragmentary end elevation of the hay wagon. Fig. 3 is a perspective view of one portion of one of the side braces. Fig. 4 is a perspective view of the pawl which engages the brace shown in Fig. 3. Fig. 5 is a sectional view through the brace, and shows the manner of connecting the pawl with the brace.

In the accompanying drawings it will be seen that this invention comprises the bottom 10 with which the side walls 11 and end walls 12 are pivotally connected by means of suitable hinges. The side walls are provided with the end bracing bars 14 which form continuations of the hinges which connect the side walls with the bottom and are also provided with intermediate braces 15 with which the adjusting means is connected. Brackets 16 are carried by the bottom beneath the intermediate bracing bars 15 and rods 17 are pivotally connected with the brackets 16 and have their upper ends pivotally connected with the pawls 18. Each of these bracing bars 15 is provided with a rib 19 which is supported above the bar by means of a web 20 thus leaving the side portions of the rib in spaced relation to the bracing bar. Teeth 21 are formed upon the rib 19 and are engaged by the pawl 18 so that the side walls may be held in the position shown in Fig. 3 or in the position shown in Fig. 2. The pivot ears 22 of the pawl 18 carry pins 23 which extend beneath the side portions of the rib 19 so that the pawl will be prevented from becoming detached from the rib. It will thus be seen that after the side walls have been raised to the position shown in Fig. 3 that the pawls cannot slip from the ribs and, therefore, there is no danger of the side walls dropping from the raised positions and thus permitting the animal to escape, or the contents of the wagon to spill out.

Hooks 24 are carried by the forward ends of the side walls and are connected with chains 25 carried by the front wall 12 so that the front wall may be held in the position shown in Fig. 1 in order to convert the wagon into a hay wagon. It is, of course, obvious that when the wagon is in the form shown in Fig. 3 that the hooks may be connected with the front wall thus preventing the front wall from dropping. Hooks 26 are also carried by the rear end portions of the side walls and are adapted to engage the rear wall so that the rear wall may be held in a raised position or may be lowered as shown in Fig. 2 in order to lead the pigs into the wagon, or may be placed flat upon the bottom of the wagon, as shown in Fig. 1.

When using this device as a hog rack the side walls are raised to the position shown in Fig. 3 and are held in this raised position by the locking pawls 18. The front wall is raised and held in the raised position by means of the hooks 24 and the rear wall is lowered to form a gang way up which the hogs may be led. After the hog is placed in the wagon the rear door is raised and the hog will then be held in the wagon. If desired, the wagon when in the position shown in Fig. 3 may be used for conveying articles of food such, for instance, as potatoes, cabbages, corn, or the like. When it is desired to convert this wagon into a hay wagon the hooks 24 are connected with the chains 25 so that the front wall may be moved outwardly and the pawls 18 will then be released from the teeth 21 thus permitting the side walls to be moved outwardly and are then supported in the outward position by releasing the pawl and permitting it to be brought into engagement with the teeth again.

It should be noted that the pins 23 which are carried by the pivot ears 22 of the pawls are mounted in the space beneath the side portions of the rib 19 and therefore the pawls are held in engagement with the ribs and prevented from slipping out of place.

When this wagon is used as a hay wagon the rear wall is lowered upon the bottom 10 of the wagon and the hooks 26 which are connected with the door act as additional braces for supporting the side walls near their rear ends.

It will thus be seen that there has been provided a wagon which may be easily converted from a hog rack into a hay frame.

Having thus described the invention, what is claimed as new is:—

1. A convertible wagon body comprising a bottom, side walls hinged to said bottom, bracing bars carried by said side walls, ribs carried by said bracing bars and having their side portions in spaced relation thereto, said ribs having rack teeth formed upon their outer faces, brackets carried by said bottom beneath said bracing bars, rods pivotally connected with said brackets, pawls pivotally connected with the free ends of said rods, and adapted to engage the teeth of said ribs, to hold said side walls in a desired position, pins carried by the pivot ears of said pawls and fitting beneath said ribs to hold said pawls in engagement with said rods.

2. A wagon body comprising a bottom, side walls hinged to said bottom, bracing bars extending from said hinges and extending vertically upon said side walls, rack teeth formed upon said bars, said bars being provided with longitudinally-extending side grooves, brackets carried by said bottom, rods pivotally connected with said brackets, pawls pivotally connected with the free ends of said rods and adapted to engage the teeth of said bars to hold said side walls in an adjusted position, and pins carried by the pivot ears of said pawls and positioned in said grooves to slidably connect said pawls with said bars.

3. A wagon body comprising a bottom, side walls hinged to said bottom, bracing bars carried by said side walls and provided with rack teeth upon their outer faces, brackets carried by said bottom, rods pivotally connected with said brackets, and pawls pivotally connected with said rods and slidably connected with said bars, whereby said pawls may be brought into and out of engagement with the teeth of said bars to hold said side walls in an adjusted position.

In testimony whereof I hereunto affix my signature in presence of two witnesses.

JAMES E. BRIGHT.

Witnesses:
  WM. H. LARNED,
  A. BRIGHT.

---

Copies of this patent may be obtained for five cents each, by addressing the "Commissioner of Patents, Washington, D. C."